United States Patent Office 3,627,482
Patented Dec. 14, 1971

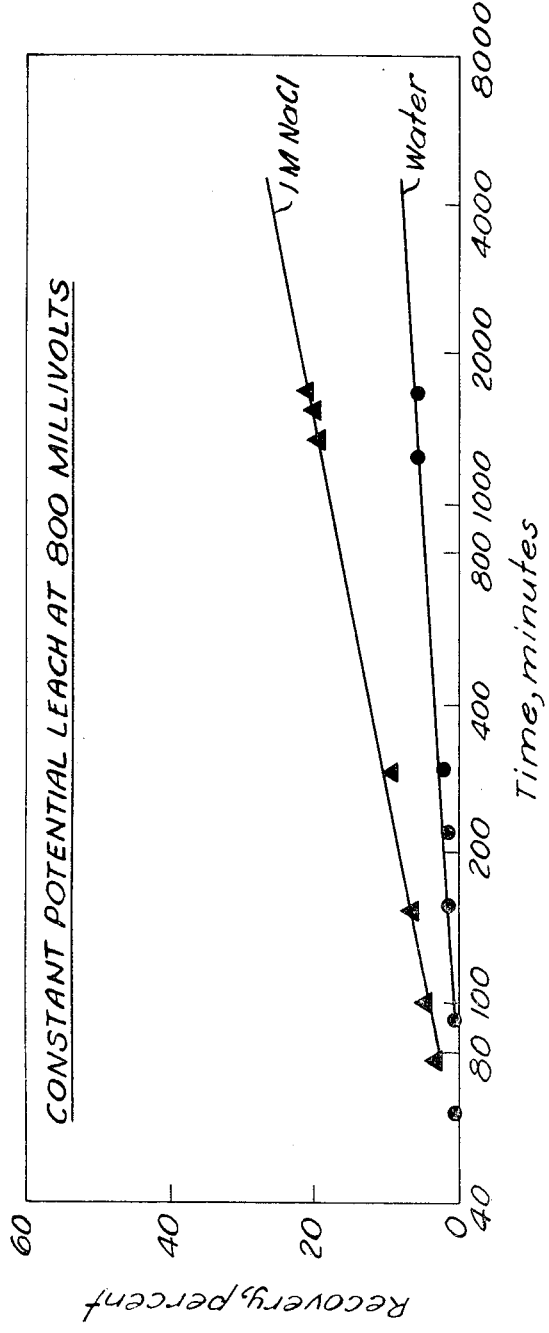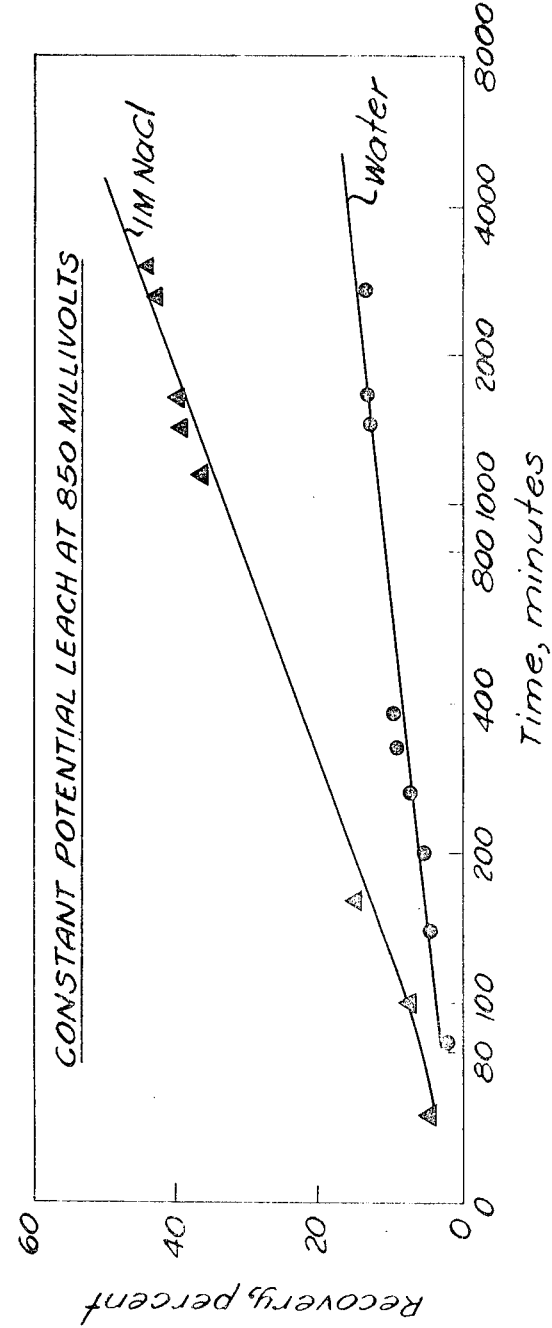
Fig. 2
Fig. 3

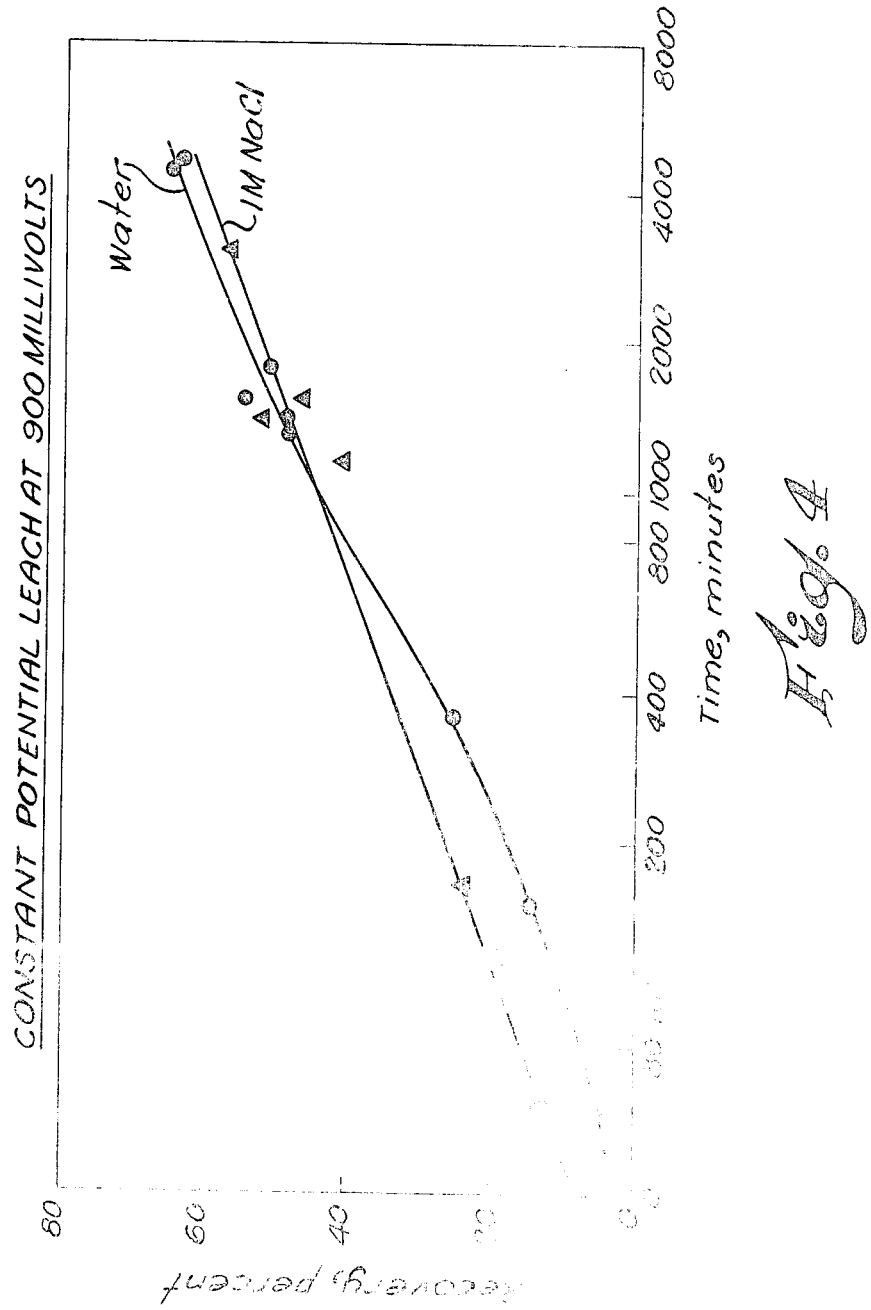

3,627,482
MERCURY ORE LEACHING PROCESS
Robert S. Olson, Lafayette, and Elmer C. Tveter, Walnut Creek, Calif., assignors to The Dow Chemical Company, Midland, Mich.
Filed May 2, 1969, Ser. No. 821,222
Int. Cl. C01g 13/04; C22b 3/00
U.S. Cl. 23—87 R                14 Claims

ABSTRACT OF THE DISCLOSURE

Disclosed herein is a process for leaching mercury values from their respective ores. The leaching solution comprises both an oxidizing agent such as dissolved chlorine or hypochlorite, and an inorganic salt, e.g. sodium chloride. The presence of the salt enhances the rate of mercury solubilization.

BACKGROUND OF THE INVENTION

Presently, a relatively quick and convenient method is needed to leach mercury values such as cinnabar (HgS) from the ores. Additionally to facilitate separation from the leaching solution mercury values should be in the form of mercuric chloride ($HgCl_2$).

Wagner (Journ. Pract. Chem., (1) 98 23, 1866) found that an aqueous solution of iodine and potassium iodide decomposes cinnabar:

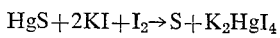

The product of the reaction is a complex iodide.

Field (J. Chem. Soc., 12, 158, 1859) discovered that cinnabar is readily soluble when boiled with a mixture which develops chlorine, such as hydrochloric acid and manganese dioxide or antimonic or arsenic oxides. The solubilized mercury values are present in solution as mercuric chloride.

The present invention arises from the discovery that the leaching action of aqueous chlorine (or hypochlorite) solutions is improved by the presence in the aqueous leaching solution of an inorganic chloride salt. Specifically, in relation to a simple hypochlorite or chlorine leach, the additional presence of the inorganic chloride improves mercury recovery, increases leach rate, decreases chlorine consumption, increases the permissible mercury concentration in the leaching solution, and increases the range of hydrogen ion concentration (pH) over which the process is operable.

FIGS. 2–4 show the time rate of solubilization of mercury values, where the leaching process is conducted at a series of constant oxidation potentials.

Figure 1:
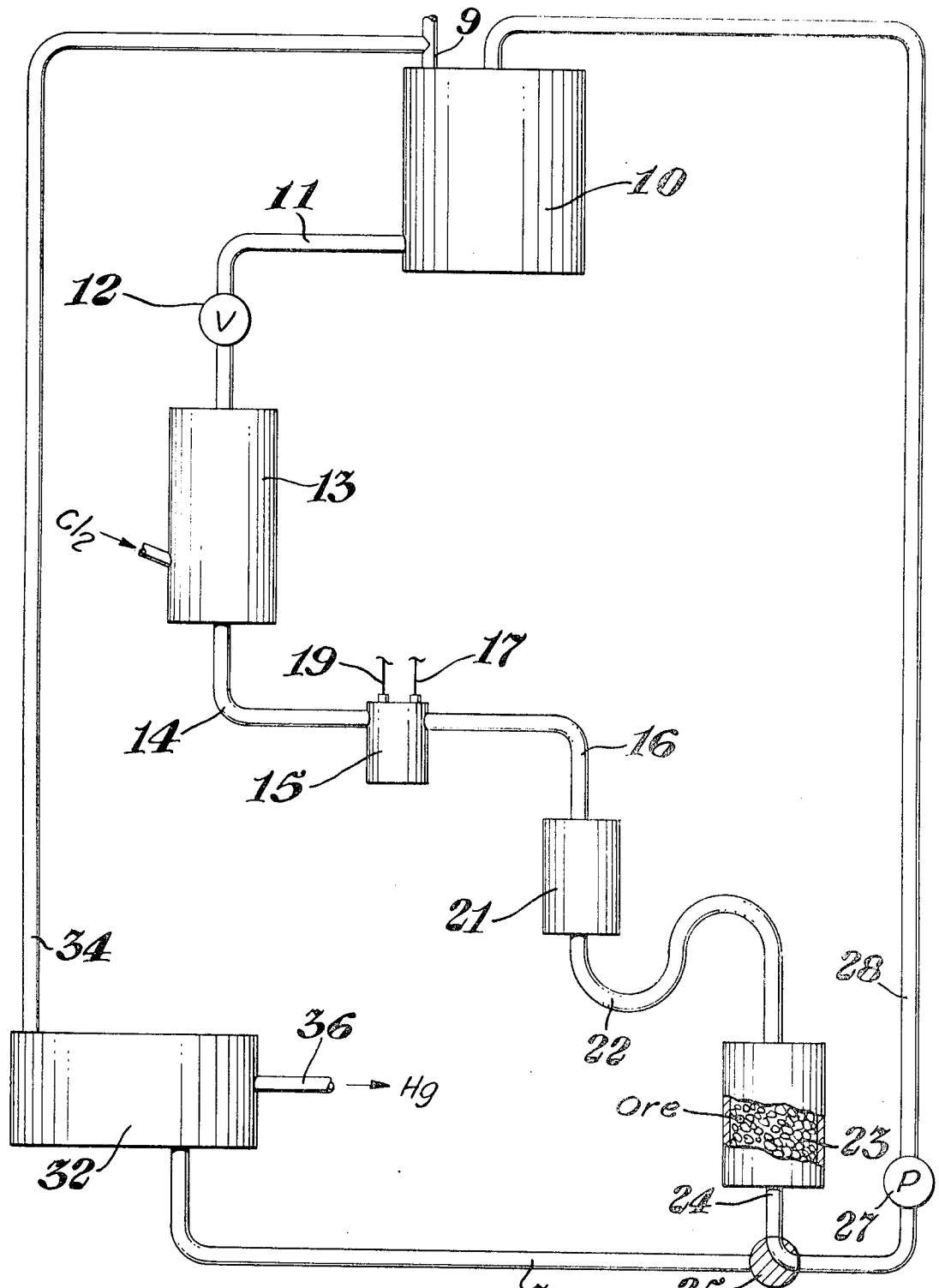
FIG. 1 depicts a schematic flow diagram and apparatus for leaching mercury ores at constant potential.

In carrying out the present invention, crushed mercury containing ore is contacted with an aqueous leaching solution comprising a chlorine based oxidizing species, such as chlorine or hypochlorite ion, and an inorganic halide salt or mixture of salts sufficient to enhance the rate of mercury solubilization. As the ore is contacted with the aqueous solution, the mercury values are solubilized to form a mercury-loaded aqueous phase. Subsequently the loaded phase is separated from the residual solid ore tailings.

The leach solution of mercury values is relatively pure and can be employed without further processing as a mild oxidizing solution in analytical work.

The solution can be further processed to obtain metallic mercury. Commonly employed separating methods include charcoal adsoption, sulfide precipitation, metal replacement, and electrolysis.

In the present invention, it is not critical how the oxidizing species are produced in the aqueous leaching solution. Also, it is not critical whether the oxidizers are added to the solution before or during actual contact with the ore.

Conveniently, the aqueous leaching solution is contacted with chlorine gas prior to contact with the ore to produce oxidizing species therein. Addition of the oxidant to the leaching solution can also be carried out simultaneously as the solution contacts the ore, e.g., an aqueous salt solution can be percolated downwardly through a pile of crushed ore while chlorine gas is introduced at the bottom of the pile so that it rises counter-currently to the flow of leach solution. Oxidizing species are also produced in situ by electrolysis of the chloride-containing leach solution before or during leaching.

In the present invention, oxidizing species refer to various chlorine-based oxidizing species in the aqueous leaching solution, such as hypochlorite ion ($OCl^-$), chlorine ($Cl_2$), and chlorine oxides ($OCl_2$). Specifically the oxidizing species do not include chloride ion ($Cl^-$). The concentration of oxidizing species (as defined above) in the aqueous leaching solution is from 0.0001 to 0.1 molar. If the concentration is above about 0.1 molar, undesirable side reactions tend to occur. At molarities of less than about 0.0001 molar, the solubilization rate for mercury values is undesirably slow.

Inorganic chloride salts which can be employed in the present invention should be water soluble. Preferably the salt will be the chloride of ammonium, alkali metals, or alkaline earth metals; for example ammonium chloride, sodium chloride, magnesium chloride and calcium chloride or mixtures thereof. While the above described salt solutions are generally synthetic, naturally-occurring mixtures of salts such as seawater or the subterranean brines occurring in Central Michigan could also be employed.

In the leaching solution, a sufficient amount of chloride ion should be present so that the molar ratio of chloride ion ($Cl^-$) to mercury dissolved in the leaching solution is at least 4, and preferably is greater than 6. The chloride ion concentration in the leaching solution will generally fall within the overall range of from about 0.05 to about 5 molar. Preferably the chloride ion concentration will be from about 0.2 to about 2 molar.

In contacting the ore the hydrogen ion concentration in the aqueous leaching solution should be maintained at a pH of from about 3 to 9, and preferably at a pH of 6 to 8. At relatively acidic pH levels below 6, mercury is leached from the ore; however, the leach solution is very corrosive and wear rate of equipment is high. Hydrogen ion concentration can generally be maintained within desirable levels by addition of limestone or other basic substances. Frequently these materials are present as impurities in the mercury ore.

As the process is carried out, temperatures up to the normal boiling point of the aqueous phase can be employed. Generally the temperature will be an ambient temperature, e.g. about 10° C. to 40° C., since temperatures above ambient temperature tend to reduce the stability of oxidizing species.

In general, pressures during reaction are not critical. However, the ore frequently contains carbonate impurities such as dolomite which produce carbon dioxide gas under reaction conditions. If this gas is maintained in the leach solution by elevated pressures, the acidity of the solution is increased which increases the corrosivity of the solution correspondingly.

Operability of the present invention is not dependent upon the size of ore particles employed, with some degree of leaching taking place even where coarse (i.e. 2 inch mesh, U.S. Standard Sieve Series) particles are employed. Of course, as particle size is decreased, more surface area is exposed and the percent recovery of mercury is increased greatly. Preferably the ore particles will be less than about 3 inch mesh in size.

Commonly employed types of leaching methods can be employed in the present process. For example, the crushed ore can be immersed in a vat containing leach liquor, or the ore can be slurried with the leach liquor and agitated. Percolation leaching can also be employed.

Mercury ores employed generally contain at least 0.0001 weight percent of mercury. Suitable naturally-occurring ores contain, for example, cinnabar, calomel, metacinnabar, and livingstonite.

DESCRIPTION OF PREFERRED EMBODIMENTS

A preferred embodiment of the invention comprises contacting ore, which has been crushed, or ground, with a chlorinated aqueous saline solution. The mercury values are solubilized into the aqueous solution which is separated from the residual solid tailings.

A typical method for carrying out this embodiment is to place the particulate ore in a vat or other container which contains a chloride solution. Optionally the vat can be equipped with an agitating means such as a stirrer. The vat should be designed to facilitate circulation of the extractant solution through the ore charge.

The vat can also be equipped with an entry port whereby chlorine gas is introduced into the solution. Optionally the chlorine addition can take place in a feed stream at a point external to the vat.

As chlorine is introduced into the leaching solution, reaction will occur to produce oxidizing species such as hypochlorite ($OCl^-$) or chlorine oxides. Also small amounts of dissolved chlorine may be present in solution. As the chlorinated solution is circulated into contact with the ore, mercury values of the ore will dissolve. The loaded solution is then removed from the vat, and can be processed further to obtain metallic mercury.

The above vat leaching system can be operated on a batch basis. However, the system is ideally suited to continuous operation.

With reference to FIG. 1, reservoir vessel 10, contains a reservoir of inorganic chloride salt solution (e.g. sodium chloride). Initially vessel 10 is supplied with the salt solution through conduit 9. Vessel 10, discharges through conduit 11 into scrubbing column 13 wherein the solution is contacted with chlorine gas from a chlorine generator (not shown). The rate of discharge from vessel 10 is controlled by valve 12. The column 13 discharges through conduit 14 into a measuring vessel 15 containing a standard calomel electrode 17 and a platinum electrode 19. The measuring vessel 15 discharges through conduit 16 into a syphoning vessel 21 which discharges through conduit 22 into a leaching column 23 containing crushed mercury ore. The leaching column discharges into conduit 24 which communicates with three-way valve 25. Valve 25 can be adjusted so that the mercury-laden leaching solution flows through recycle conduit 28 and pump 27 back to reservoir 10. Optionally, by adjusting valve 25 in the opposite direction, the mercury-laden leaching solution flows through conduit 30 which communicates with mercury extractor 32, wherein the dissolved mercury is absorbed on charcoal which is subsequently retorted by heating means for mercury recovery. The mercury-depleted leaching solution and the metallic mercury exit from the extractor through conduits 34 and 36 respectively. The leaching solution can be recirculated and rechlorinated through conduit 9.

A typical continuous cycle of operation would comprise chlorine introduction, contacting the chlorinated liquor with the ore, removing mercury values from the loaded ore by charcoal absorption or other appropriate means, and recirculating the mercury-depleted, chloride-containing liquor. Continuous operation is especially feasible because the chloride salts are not generally consumed during leaching or separation of the mercury values and therefore do not need to be replaced in the recycle stream. While chlorination as described above, is accomplished by the use of chlorine gas, other reagents such as sodium or potassium hypochlorite can also be employed.

In the leaching process as described above, the concentration of oxidizing values should be from 0.001 to 0.02 molar to insure optimum leaching rates, optimum recovery of mercury values, and most efficient utilization of the oxidizing species.

Conveniently the concentration of oxidizing values is determined by insertion of oxidation-reduction electrodes e.g., standard calomel and platinum electrodes into the system to measure the oxidation potential of the salt solution. The potential as measured at the electrodes is a function of the concentration of oxidizing species. It has been found that optimum leaching rate is obtained where the electrode potential of the aqueous leaching solution (as measured by a platinum electrode and a standard calomel electrode) immediately prior to contacting the ore is from about 800 to 1000 millivolts, and preferably is from about 825 to 900 millivolts. To conrol the concentration of oxidizing values within the above-described ranges, the rate of addition of chlorine or hypochlorite can be decreased if the potential rises above 1000 millivolts, and can be increased if it falls below 800 millivolts.

Another preferred embodiment of the present invention comprises electrolyzing the aqueous chloride solution to produce oxidizing values in situ thereby eliminating the need for introducing chlorine or hypochlorite into the system. The electrolysis can be carried out concurrently with leaching—i.e. the solution can be electrolyzed simultaneously as it comes into contact with the ore. Optionally, electrolysis can be carried out prior to contacting the solution and the ore. The mercury-loaded leach liquor can be recirculated, used directly, or processed further as described above. In electrolyzing the aqueous salt solution, the rate of electrolysis should be sufficient to provide a solution potential (as measured by a platinum and a standard calomel electrode) of from 800 to 1000 millivolts and preferably of from 825 to 900 millivolts.

EXAMPLE OF THE INVENTION

Using apparatus similar to that depicted in FIG. 1 a number of runs were conducted. All ore samples were crushed in a jaw crusher set at ¼ inch. The general testing procedure involved placing a 2000 gram sample of crushed ore in leach column 23. About 600 ml. of a 1 molar aqueous NaCl solution was then introduced into the system. The feed rate from reservoir vessel 10 was adjusted to about 60 ml./min. The chlorine generator was turned on, and the potential across electrodes 17 and 19 was determined. The chlorinated leaching solution passed through syphoning vessel 21 and percolated through the ore in column 23. The mercury-loaded leach solution discharging from column 23 was recirculated by pump 27 through conduit 25 to reservoir vessel 10. Samples of the solution were taken periodically and analyzed for mercury content. Occasionally the pH and hypochlorite content of the leaching solution were also determined.

During the runs, the potential at electrodes 17 and 19 was maintained at a generally constant predetermined level by controlled addition of chlorine gas. Runs were carried out at potentials of 800, 850 and 900 m.v. The variation of potential from the desired level (e.g. 800, 850 or 900 m.v.) during the runs was about 10 m.v. Each run was conducted using a fresh ore sample and a fresh NaCl solution.

As a control, 600 ml. of water was introduced into the system and a leaching run was conducted on a fresh ore sample at an electrode potential of 800 m.v. Similar runs were conducted at potentials of 850 and 900 m.v.

Each leaching run was allowed to proceed for 2 to 3 days. The runs were terminated when analysis of the leaching solution showed that very little mercury was being dissolved.

The recovery of mercury as a function of time is set forth in FIGS. 2, 3 and 4. From FIGS. 2 and 3, the leach rate for the NaCl-containing leaching solution is substantially greater than for the salt-free leaching solutions. At 900 m.v. (FIG. 4) the difference in leach rates is less pronounced due to the relatively large amounts of oxidizing species present in the leach solution.

Percent recovery of mercury was determined according to the following formula:

Percent recovery of Hg
$$= \frac{\text{(amount of Hg in solution)}}{\text{(total Hg in ore sample before leading)}} \times 100$$

What is claimed is:

1. In a process for extracting mercury from a mercury-containing ore by leaching the ore with an aqueous, hypochlorite ion-containing solution to produce a mercury-containing solution, the improvement which comprises:
contacting the ore with a leaching solution containing hypochlorite ions and an inorganic chloride salt selected from the group of ammonium chloride, sodium chloride, magnesium chloride and calcium chloride, said leaching solution having a pH of from about 3 to 9, with the concentration of inorganic salt in the leaching solution being from 0.2 to 5 molar, the concentration of hypochlorite ions being from 0.0001 to 0.1 molar, and the chloride ion concentration being sufficient to provide in the mercury-containing solution a molar ratio of chloride ion to mercury of at least 4, whereby the leaching rate of the process is improved.

2. The improvement as in claim 1 and including separating the mercury-containing solution from residual solid ore tailings.

3. The improvement as in claim 1 including forming the leaching solution by dissolving alkali-metal hypochlorite in an aqueous inorganic salt solution.

4. The improvement as in claim 1 and including the step of forming the leaching solution by contacting an aqueous inorganic salt solution with gaseous chlorine.

5. The improvement as in claim 4 wherein chlorine gas is bubbled through the aqueous salt solution simultaneously as the solution contacts the ore.

6. The improvement as in claim 4 including the step of contacting the aqueous salt solution with chlorine gas and subsequently contacting the ore with the aqueous leaching solution.

7. The improvement as in claim 1 wherein the concentration of the hypochlorite ion in the aqueous leaching solution is from 0.001 to 0.01 molar.

8. The improvement as in claim 1 wherein the inorganic salt is sodium chloride.

9. The improvement as in claim 1 wherein the aqueous leaching solution is seawater or a natural brine containing hypochlorite ions.

10. The improvement as in claim 1 wherein the aqueous leaching solution is formed by subjecting an inorganic chloride salt solution to electrolysis to produce the hypochlorite ions in situ.

11. The improvement as in claim 1 wherein the electrode potential of the aqueous leaching solution as measured by standard calomel and platinum electrodes is from 800 to 1000 millivolts.

12. The improvement as in claim 11 wherein the electrode potential of the aqueous leaching solution is from 825 to 900 millivolts.

13. The improvement as in claim 1 including the step of processing the mercury-containing solution to remove mercury values therefrom following separation of the solution from the ore tailings.

14. The improvement as in claim 13 including the step of recirculating the processed, mercury-depleted, aqueous leaching solution to contact the ore.

References Cited

UNITED STATES PATENTS

| | | | |
|---|---|---|---|
| 1,637,481 | 8/1927 | Glaeser | 23—87 X |
| 2,288,841 | 7/1942 | Ritter | 23—86 |
| 2,662,858 | 12/1953 | Brandon | 23—86 X |
| 3,083,079 | 3/1963 | Calkins et al. | 23—87 |
| 3,199,949 | 8/1965 | Clerbois et al. | 23—86 |
| 3,476,552 | 11/1969 | Parks et al. | 75—101 |

OTHER REFERENCES

J. W. Mellor: "A comprehensive Treatise on Inorganic and Theoretical Chemistry," vol. 2, 1922 Ed.; p. 66, Longmans, Green & Co., New York, N.Y.

EDWARD STERN, Primary Examiner

U.S. Cl. X.R.

75—101, 121